United States Patent
Adams et al.

(10) Patent No.: US 11,295,161 B2
(45) Date of Patent: Apr. 5, 2022

(54) LOCALIZATION USING SEMANTICALLY SEGMENTED IMAGES

(71) Applicant: Zoox, Inc., Foster City, CA (US)

(72) Inventors: Derek Adams, Santa Clara, CA (US); Nathaniel Jon Kaiser, Foster City, CA (US); Michael Carsten Bosse, Cupertino, CA (US)

(73) Assignee: Zoox, Inc., Foster City, CA (US)

( * ) Notice: Subject to any disclaimer, the term of this patent is extended or adjusted under 35 U.S.C. 154(b) by 80 days.

(21) Appl. No.: 16/419,903

(22) Filed: May 22, 2019

(65) Prior Publication Data

US 2021/0182596 A1  Jun. 17, 2021

(51) Int. Cl.
| | |
|---|---|
| *G06K 9/46* | (2006.01) |
| *G06K 9/62* | (2022.01) |
| *G06T 7/12* | (2017.01) |
| *G06N 20/00* | (2019.01) |
| *G06K 9/00* | (2022.01) |
| *G06T 7/73* | (2017.01) |

(52) U.S. Cl.
CPC ....... *G06K 9/4671* (2013.01); *G06K 9/00798* (2013.01); *G06K 9/00818* (2013.01); *G06K 9/6256* (2013.01); *G06N 20/00* (2019.01); *G06T 7/12* (2017.01); *G06T 7/74* (2017.01)

(58) Field of Classification Search
None
See application file for complete search history.

(56) References Cited

U.S. PATENT DOCUMENTS

| | | |
|---|---|---|
| 2016/0140424 A1 | 5/2016 | Wang et al. |
| 2016/0140438 A1 | 5/2016 | Yang et al. |
| 2018/0307238 A1* | 10/2018 | Wisniowski ............ G01S 17/86 |
| 2019/0050648 A1 | 2/2019 | Stojanovic et al. |
| 2019/0111932 A1 | 4/2019 | Falconer et al. |
| 2019/0279005 A1 | 9/2019 | Ogale et al. |

(Continued)

FOREIGN PATENT DOCUMENTS

| | | |
|---|---|---|
| WO | WO2018017793 A1 | 1/2018 |
| WO | WO2018204656 A1 | 11/2018 |
| WO | WO2019092418 A1 | 5/2019 |

OTHER PUBLICATIONS

PCT Search Report and Written Opinion dated Jul. 23, 2020 for PCT Application No. PCT/US20/33412, 9 pages.

*Primary Examiner* — Leon Viet Q Nguyen
(74) *Attorney, Agent, or Firm* — Lee & Hayes, P.C.

(57) ABSTRACT

Techniques are discussed for determining a location of a vehicle in an environment using a feature corresponding to a portion of an image representing an object in the environment which is associated with a frequently occurring object classification. For example, an image may be received and semantically segmented to associate pixels of the image with a label representing an object of an object type (e.g., extracting only those portions of the image which represent lane boundary markings). Features may then be extracted, or otherwise determined, which are limited to those portions of the image. In some examples, map data indicating a previously mapped location of a corresponding portion of the object may be used to determine a difference. The difference (or sum of differences for multiple observations) are then used to localize the vehicle with respect to the map.

20 Claims, 6 Drawing Sheets

(56) References Cited

U.S. PATENT DOCUMENTS

| | | | |
|---|---|---|---|
| 2019/0375422 A1* | 12/2019 | Shtrom | G01S 13/003 |
| 2019/0384294 A1 | 12/2019 | Shashua et al. | |
| 2020/0018605 A1* | 1/2020 | Kusano | B60W 30/12 |
| 2020/0064827 A1* | 2/2020 | Miller | G06F 3/017 |
| 2020/0098135 A1* | 3/2020 | Ganjineh | G06T 7/11 |
| 2020/0174130 A1* | 6/2020 | Banerjee | G05D 1/0248 |
| 2020/0184233 A1 | 6/2020 | Berberian et al. | |
| 2020/0302239 A1* | 9/2020 | Wang | G06N 3/0481 |
| 2020/0372285 A1 | 11/2020 | Adams et al. | |

* cited by examiner

LOCALIZATION USING SEMANTICALLY SEGMENTED IMAGES

BACKGROUND

Various methods, apparatuses, and systems are utilized by autonomous vehicles to guide such autonomous vehicles through environments including various static and dynamic objects. For instance, autonomous vehicles utilize route planning methods, apparatuses, and systems to guide autonomous vehicles through congested areas with other moving vehicles (autonomous or otherwise), moving people, stationary buildings, etc. In some examples, an autonomous vehicle may make decisions while traversing an environment to ensure safety for passengers and surrounding persons and objects. A variety of sensors may be used to collect information, such as images, of the surrounding environment, which may be used by the autonomous vehicle to make decisions on how to traverse the environment. Accurately determining a location of the vehicle in the environment may, at times, present challenges.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features, in accordance with examples of the disclosure.

DETAILED DESCRIPTION

Figure 1:
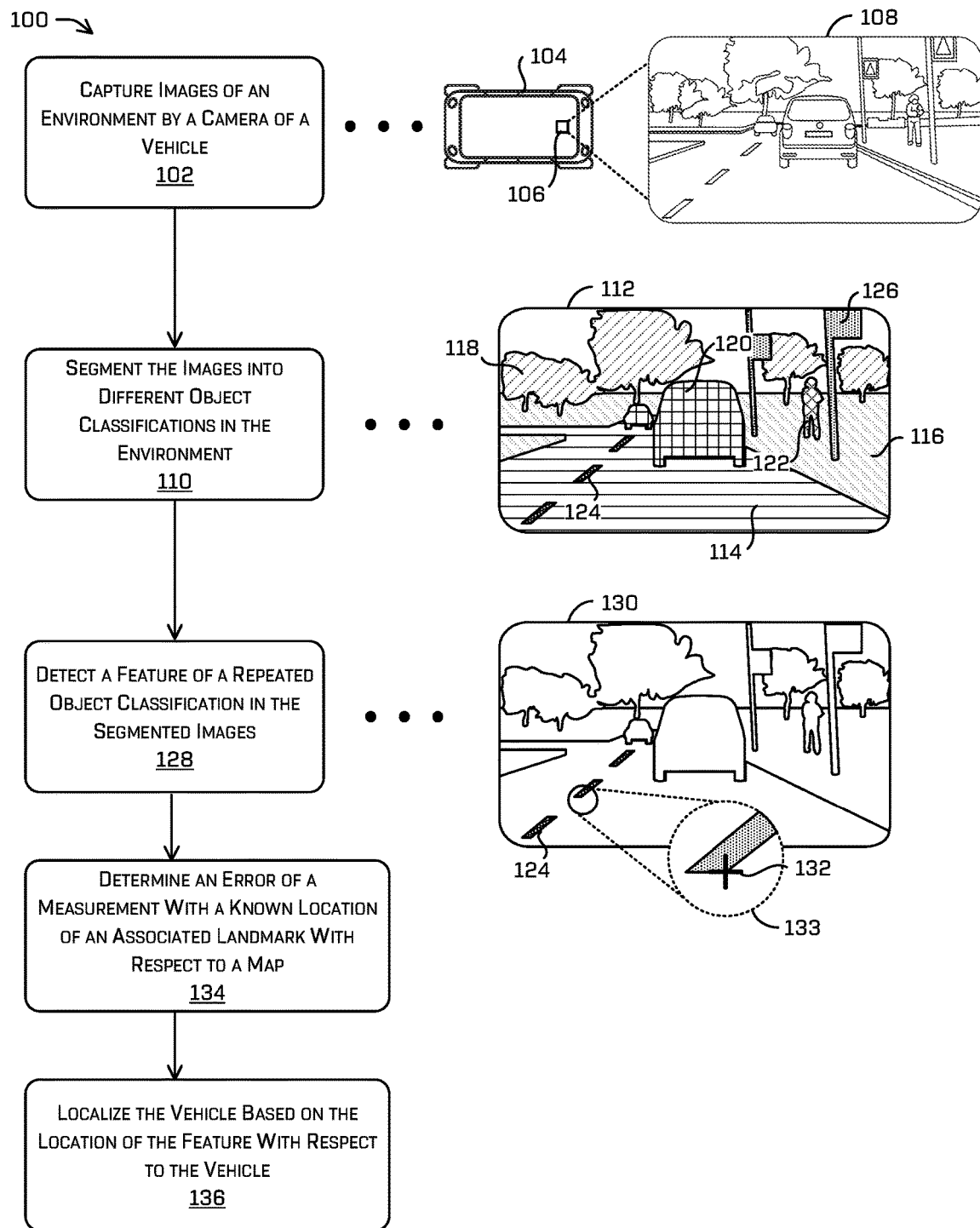
FIG. 1 is a pictorial flow diagram of segmenting images captured by a camera of a vehicle into different classifications, detecting a feature associated with a repeated object classification, and determining a location of the vehicle based at least in part on the feature, in accordance with examples of the disclosure.

This disclosure relates to determining a location of a vehicle (e.g., an autonomous vehicle) in an environment using locations of objects having a repeated object classification, such as lane markings, detected by the vehicle as the vehicle traverses the environment. In many cases, vehicles receive location information from sources such as global positioning systems (GPS), odometers, inertial measurement units (IMUs), simultaneous localization and mapping (SLAM) systems, calibration localization and mapping simultaneously (CLAMS) systems, among other techniques. However, in some cases, these techniques may provide insufficient information to a vehicle to maintain an accurate trajectory. For instance, in a location such as a tunnel, a vehicle may be unable to access a reliable GPS signal, and may not have differentiated landmarks inside the tunnel to rely upon SLAM and/or CLAMS systems. While odometers and IMUs may be used in such cases where GPS, SLAM, and/or CLAMS may be less reliable, some error may be present with these sources of location data, which may compound over time.

Thus, in some examples, the techniques described herein may supplement other localization systems to provide continuous, accurate determinations of a location of a vehicle. For instance, a semantic segmentation (SemSeg) localization component of a vehicle may use semantically segmented images to detect objects in an environment of a frequently occurring classification, such as lane markers, parking space markers and/or meters, mile markers, railing posts, structural columns, light fixtures, and so forth. Objects of an object type (or classification) that are frequently occurring may be leveraged by the SemSeg localization component to detect features (e.g., a corner, side, center, etc.) of the objects in the images. Further, the associated features of the objects may be associated with a map of an environment, indicating a known location of the feature (which may be referred to herein as a landmark). The measured position (e.g., the detected feature in the image) may then be used to localize the vehicle based on differences between the landmark and the measured position of the feature, in addition to any previous estimate of position based on any one or more additional sensor modalities. In this way, an accurate location of the vehicle can be determined simply with images captured by a sensor of the vehicle such as a camera and stored map data, without having to access a GPS system and/or rely on landmarks that may not be visible to the vehicle or may occur too infrequently in a variety of scenarios (e.g., tunnels, overpasses, etc.) to localize the vehicle.

Sensor data captured by the vehicle can include lidar data, radar data, image data, time of flight data, sonar data, odometer data (such as wheel encoders), IMU data, and the like. In some cases, the sensor data can be provided to a perception system configured to determine a type (classification) of an object (e.g., vehicle, pedestrian, bicycle, motorcycle, animal, parked car, tree, building, and the like) in the environment.

For instance, the sensor data may be captured by the vehicle as the vehicle traverses an environment. In some examples, the vehicle may include one or more cameras configured to capture sequences of images (e.g., individual images and/or video) of the surrounding environment. Images in the sequence of images may be semantically segmented to associate pixels of an image with a label indicating the associated classification, e.g., drivable region, car, pedestrian, sidewalk, traffic control signal, and so forth. The SemSeg localization component may detect an object in the semantically segmented image that is of a repeated object classification, e.g., that the object is repeated in the environment, such as at regular or irregular intervals. In some cases, the determination that such an object is present in a semantically segmented image may be determined using a machine-learned model trained to detect objects that repeat in an environment. The machine-learned model may be further trained to extract associated features from the regions of the image associated with the object, such that the automatically detected features can be further input into a localization model using the map and/or an estimated position of the vehicle.

Additionally or alternatively, the SemSeg localization component may detect a feature of the object in the semantically segmented image. As noted above, objects that are repeated in an environment such as lane markers and light fixtures can be used to extract features for localization. For example, dashed lane markers typically are rectangular in shape, having long straight edges and 90-degree corners. Further, the SemSeg localization component may in some cases narrow the likelihood that an object is a lane marker based on detecting that the lane marker is depicted on a drivable surface in the semantically segmented image. Alternatively or additionally, when creating the map, multiple observations of the features may be collected and combined in image space and/or by unprojecting (e.g., finding an intersection of a ray passing through the point in the image with the 3D map). In at least some examples, no such map may be used. In such examples, bundle adjustment, structure from motion, Kalman filters, or other estimations may be used to jointly estimate both positions of observations and the position and/or orientation of the vehicle in the environment.

In at least some examples, the SemSeg localization component may determine a location of the feature with respect to the vehicle, such as by using lidar, radar, time of flight data, multi-view geometry from a plurality of image sensors, or other techniques for determining a depth of a point in the environment associated with the feature. For example, lidar points corresponding to a region of interest ("ROI") in the image and corresponding to the feature of the object may be combined with image data. The lidar data may be interpolated and/or extrapolated (e.g., based on triangle building) in order to associate a depth with a particular feature in the image. For instance, a mesh may be created from corresponding lidar points and an intersection point may be found between a ray originating at a center of the camera and passing through the feature in the image and the mesh. A location of the feature may be determined by selecting a mode or mean of the cluster of lidar points as projected into the image space representing the feature in the image. In some examples, the location of the mode or median of the cluster of lidar points may be used as the point for which to determine a depth of the vehicle from the feature of the object. Additional details regarding using lidar data and image data to determine a depth can be found in U.S. patent application Ser. No. 15/970,838, which is incorporated by reference herein in its entirety.

Using the location of the measured feature (either in image coordinates or as estimated three-dimensional coordinates), the known landmark location in the map, and/or an estimated position of the vehicle in the map, the SemSeg localization component may then localize the vehicle in the environment. Localizing the vehicle using the described techniques may include updating an estimated location of the vehicle provided by other sensor systems, such as may be previously determined using odometers and/or IMUs. For example, as there is an inherent interval in the objects used in the described techniques, there may be a lapse in location updates between detection of the repeated objects. In this case, the odometer and/or IMU may be used during the intervals between detection of repeating objects, and the localization provided by referencing the repeating objects may be used to correct localization error by the odometer and/or IMU during the detection intervals.

The techniques discussed herein can improve a functioning of a computing device in a number of ways. As mentioned above, the SemSeg component may use semantically segmented images, which may already be captured and processed by an autonomous vehicle, to accurately determine a location of the vehicle without GPS, SLAM, and/or CLAMS. In some cases, the described techniques may be more accurate than other location detection mechanisms, such as odometers and IMUs that may accumulate compounded error without being checked by another system (e.g., when performing dead-reckoning from a last known accurate position). By controlling the vehicle based at least in part on objects that occur multiple times throughout an environment detected in semantically segmented images, the safety of the vehicle can be improved by correcting location error faster and earlier, thus allowing the vehicle to make trajectory decisions earlier. Additionally as just described, controlling the vehicle based at least in part on determining recurring objects detected in semantically segmented images can reduce processing resources, by relying on fewer localization systems at one time, and/or by executing localization based on the semantically segmented images at intervals. The intervals may be, for example, between individual images (e.g., every 10 frames of a video) based on distance (e.g., every 10 meters, every 1 kilometer, every 10 miles, etc.), based on time (e.g., every 10 milliseconds, every 1 second, etc.), and/or selectively utilizing different systems based on characteristics of the environment in which the vehicle currently occupies (e.g., based on number of objects or features detected in the environment). Further, techniques for controlling the vehicle based at least in part on objects of a repeated (or frequent) object classification detected in semantically segmented images can increase a confidence that the vehicle can avoid collisions with oncoming traffic and/or pedestrians by updating the location of the vehicle earlier and with greater accuracy, which may improve safety outcomes, performance, and/or accuracy. These and other improvements to the functioning of the computer are discussed herein.

The techniques described herein can be implemented in a number of ways. Example implementations are provided below with reference to the following figures. Although discussed in the context of an autonomous vehicle, the methods, apparatuses, and systems described herein can be applied to a variety of systems (e.g., a sensor system or a robotic platform), and is not limited to autonomous vehicles. In one example, similar techniques may be utilized in driver-controlled vehicles in which such a system may provide an indication to a driver of the vehicle of whether it is safe to perform various maneuvers. In another example, the techniques can be utilized in an aviation context, or in any system navigating in a system with repeating objects. Additionally, the techniques described herein can be used with real data (e.g., captured using sensor(s)), simulated data (e.g., generated by a simulator), or any combination of the two.

FIG. 1 is a pictorial flow diagram of segmenting images captured by a camera of a vehicle into different classifications, detecting a feature associated with a repeated object classification, and determining a location of the vehicle based at least in part on the feature, in accordance with examples of the disclosure.

An operation 102 includes capturing images of an environment by a camera of a vehicle. For example, a vehicle 104 is shown having at least one sensor 106, which may be configured to capture information regarding the surrounding environment. In some examples, the sensor 106 is a camera (e.g., a video camera) configured to capture images and/or video of the environment surrounding the vehicle 104. For instance, an image 108 is shown, which may be an image or frame of a video depicting the environment as captured by the sensor 106. Of course, any image sensor is contemplated (RGB, intensity, infrared, ultraviolet, etc.) which may be used as the sensor 106.

An operation 110 includes segmenting the images into different object classifications in the environment. Segmenting may include associating subsets of pixels of the image with one or more class labels. A segmented image 112 corresponds to the image 108 of the environment surrounding the vehicle 104. The segmented image 112 includes areas (e.g., subsets of pixels of the image 108) which may be labeled as a drivable region 114, a non-drivable region 116, vegetation 118, other vehicles 120, a pedestrian 122, lane markers 124, and street signs 126. In general, similar objects in the segmented image 112 are represented by similar shading, although similar objects may not be explicitly numbered for clarity. Additionally, the class labels used in the segmented image 112 are only examples of possible labels, and it should be understood that additional labels, fewer labels, and/or different labels may be used without departing from the scope of this description.

The process of segmenting the image 108 to result in the segmented image 112 may be performed in a variety of ways. In some examples, a semantic segmentation architecture may include an encoder network followed by a decoder network. The encoder network may be a pre-trained classification network (e.g., VGG-16, VGG-19, ResNet, etc.), and the decoder may semantically project discriminative features learned by the encoder onto pixel space to get a dense classification. Different approaches to semantically segment an image may include region-based semantic segmentation, fully convolutional network-based semantic segmentation, and weakly supervised semantic segmentation, to name some examples. In at least some examples, the image 108 may be input into a neural network trained to semantically segment images, and a semantically segmented image may be received from the neural network, which may be used to determine features of labeled objects in the semantically segmented image. The neural network may be part of a machine-learned model trained to detect features of repeated object classifications, where the machine-learned model uses the output of the neural network (e.g., the semantically segmented image) to detect and output features of repeated object classifications in an environment. As above, a single network may be used to both segment an image and extract features associated with particular classifications, and/or multiple steps may be used (e.g., output a first network trained to segment an image and provide masks of relevant portions of the image is then used to determine associated features).

An operation 128 includes detecting a feature of a repeated object classification in the segmented images. As described herein, a repeated object classification is a same or similar object classification that recurs in the environment. Examples of a repeated object classification include a lane marking, a light, a sign post, a barrier, and so forth. In some cases, detecting the feature may be performed by inputting the image 108 and/or the segmented image 112 into a machine-learned model trained to determine features of objects in images, and receiving the feature from the machine-learned model. In examples, feature extraction may be performed on those portions of the image associated with the repeated object classification (e.g., detecting only features in such portions). In various examples, such features may comprise extreme pixels associated with the portion (e.g., pixels associated with an edge, corner, etc.), SIFT (scale invariant feature transform), SURF (speeded-up robust features), AKAZE (accelerated multiscale 2D feature detection and description algorithm in nonlinear scale spaces), ORB (oriented FAST and rotated BRIEF), BRIEF (binary robust independent elementary features), Harris corners, embeddings, feature vectors, etc. For example, a segmented image 130 is depicted that may correspond to the segmented image 112, with only the shading of the lane markers 124 provided for clarity and emphasis. However, in some examples, the segmented image 130 (and/or the image 108) may be masked by setting pixel values to zero (or some other value) which do or do not correspond to an area of interest. For instance, an area of interest may correspond to a subset of pixels of the image 108 associated with one or more of the labels indicated above. Thus, by masking the segmented image 130, processing resources can be conserved by focusing image analysis on an area of interest, such as the lane markers 124.

A variety of different features may be used to localize the vehicle, such as a corner of an object, a SIFT feature, an embedding, a feature vector, and the like. For instance, most lane markers have a generally elongated rectangular shape, including 90-degree angles between the four sides of individual lane markers. The vehicle 104 may leverage this commonality between the lane markers 124 to select a feature of the lane markers to use for localization. For instance, the vehicle 104 may select a corner 132 of the lane markers 124 (e.g., a bottom, right corner relative to the image 108) as a feature of the lane markers 124 that will be used to localize the vehicle 104. In this way, a more precise localization may be determined than by using a location of the entire object. For example, an enlarged detail view 133 depicts the corner 132 of one of the lane markers 124 that has been selected for use in localizing the vehicle 104. In some examples, as described in more detail with respect to FIG. 2, the location of the feature (e.g., corner 132) may be projected onto the image 108 based on map data associated with the environment that includes a known location of the lane markers 124. The known location of the lane markers 124 may be determined from prior mapping runs of the environment that labeled objects such as the lane markers 124 on the map, for example.

An optional operation 134 includes determining an error of a measurement (position of the detected feature) with a pre-mapped, known, location of an associated landmark (e.g., corresponding point in the environment associated with the feature in the image) with respect to a map. In some such examples, the known landmark may be projected into the image (e.g., a corresponding pixel location of the landmark) and an image coordinate associated with a location of the feature within the image may be determined. Using the image coordinate associated with the location of the feature, an error may be computed as a difference between a landmark image coordinate (e.g., determined from prior mapping runs) and the image coordinate associated with the location of the feature in the image (e.g., as a two-dimensional vector, weighted Euclidian distance, etc.). In other examples, the detected feature in the image may be unprojected to find an intersection with a mesh (and/or otherwise find a three-dimensional position of the feature by using associated depth measurements from lidar, radar, time of flight, stereo images, etc.). The error may then be determined as the difference between the three-dimensional feature location and the location of the landmark (e.g., as a three-dimensional vector, a weighted Euclidian distance, etc.).

In some examples, a location of the vehicle 104 may be determined using SLAM, CLAMS, GPS, Bundle Adjustment, or other technique. From this determined location, the vehicle 104 may then use data provided from additional sensors such as an odometer, a wheel encoder, an IMU, an accelerometer, a gyroscope, a magnetometer to provide additional information regarding the location of the vehicle 104. For instance, an odometer and a wheel encoder may be used to measure a speed of the vehicle 104 or rotations of a wheel of a vehicle 104, respectively, to estimate a location of the vehicle 104 from the previously determined location. In some examples, localization of the vehicle 104 may be determined based at least in part on outputs of the odometer and/or wheel encoder (and/or outputs of the odometer and/or wheel encoder may be weighted more heavily in localizing the vehicle 104) when other systems (e.g., SLAM, CLAMS, GPS, etc.) become less reliable, such as in a tunnel where GPS signals may be weaker or unreliable, or a highway where few landmarks in other sensor modalities are visible to the vehicle 104 for systems such as SLAM or CLAMS. In such examples where there is no pre-mapped region, the techniques described above may jointly (simultaneously) estimate the positions of the landmarks and position of the vehicle given the controls, observations, etc.

In some examples, the vehicle 104 may determine that loss of reliable localization by systems such as GPS, SLAM, and CLAMS is likely, such as based on a selected trajectory of the vehicle 104 to pass through a tunnel, highway, or other area, or otherwise (increasing covariance, reduced number of observations in other sensor modalities, or the like). In such a case, the vehicle 104 may preemptively transfer localization to rely on other systems (e.g., an odometer, a wheel encoder, location relative to a repeating object, etc.), or otherwise reweight (downweight) contributions of certain modalities to localization in various localization algorithms, to avoid a gap in localization of the vehicle 104. Transfer of localization from one system to another may occur in a variety of scenarios, such as the vehicle coming within a threshold distance of a landmark such as a highway or tunnel, detection of a weather condition such as snow or flooding, and so forth.

An operation 136 includes localizing the vehicle based on the location of the feature with respect to the vehicle. In some examples, this may be done by performing a joint optimization based on the estimated position of the vehicle and the difference(s) determined in operation 134 (e.g., using a non-linear least squares optimization). In yet other examples, such a localization may be performed, for example, using bundle adjustment, Kalman filters, SLAM algorithms, and the like. In at least some examples, where landmark positions are determined and made available in a map, such localization may comprise an optimization based on differences of feature locations in an image and projected landmark locations in the image, among any one or more techniques for matching a point distribution to an observation. Of course, any number of observations (e.g., feature measurements) may be used simultaneously in performing such localization. Further, in some examples, localizing the vehicle may be based at least in part on a covariance associated with the estimated position, and/or a covariance associated with one or more additional sensors used for localization of the vehicle 104. In the depicted example, the vehicle 104 may receive map data indicating the locations of the landmarks associated with the lane markers 124, and use the difference determined in operation 134 to determine a location of the vehicle 104 in the environment.

In some examples, the operations described in relation to the pictorial flow diagram 100 may be executed in response to different scenarios. For instance, when a reliable GPS signal is unavailable and/or substantial landmarks are not viewable by the vehicle for use with SLAM or CLAMS systems, these systems may be "turned off," suspended, or otherwise not executed, and instead the vehicle may utilize the semantic segmentation techniques for localization based on repeating objects as described herein. Further, the operations described in relation to semantic segmentation techniques for localization may be initiated in response to receiving map data indicating that the vehicle is in or approaching a tunnel, overpass, or other area in which GPS, SLAM, and/or CLAMS may not be as reliable or accurate. In at least some examples, a covariance of measurements may be used for determining when to use these techniques. In such examples, when covariance grows beyond a threshold covariance, the techniques may be activated.

In some cases, the frequency with which the location of the vehicle 104 is determined relative to the location of the feature (e.g., corner 132) of the repeating object (in this case lane markers 124) may be based on an amount of difference between an estimated location based on data provided by another sensor (e.g., odometer or wheel encoder) and the location determined using the described semantic segmentation techniques. For example, if the estimated location based on other sensor data and the location determined using semantically segmented images are the same or within a threshold amount (e.g., less than 1 cm, 5 cm, 10 cm, etc.) then the vehicle 104 may decide to execute the determination of the location of the feature of the repeating object with respect to the vehicle 104 less frequently (e.g., every other lane marker, every fifth lane marker, every mile, etc.). However, if the difference between the estimated location based on other sensor data and the location determined using semantically segmented images is greater than a threshold amount, then the vehicle 104 may decide to execute the determination of the location of the feature of the repeating object with respect to the vehicle 104 more frequently, or may decide to select another repeating object from the semantically segmented image 112 to use to assist in localizing the vehicle 104.

In some examples, both the estimated location based on other sensor data and the location determined using semantically segmented images may be used in localizing the vehicle 104, where weights are applied to the estimated location and the determined location based on where the vehicle 104 is located in the environment. More specifically, the estimated location and the determined location may be weighted based on a proximity of the vehicle 104 to a landmark such as a tunnel, an overpass, a highway, and so forth. Additionally or alternatively, weights may be applied to other localization data from GPS, SLAM, CLAMS, or others based on a proximity to landmarks in the environment. In an example, if the vehicle 104 is in an urban area having numerous landmarks visible to sensors of the vehicle 104, then localization data provided by SLAM and/or CLAMS may be weighted more heavily than localization data provided from semantically segmented images as described using the techniques herein. Similarly, if the vehicle 104 is in a landmark such as a tunnel where few or no other visible landmarks are present, then localization data provided from semantically segmented images as described herein may be weighted more heavily than localization data provided by SLAM and/or CLAMS.

Accordingly, in such examples, processing resources of a computing device associated with a vehicle may be used efficiently to provide accurate localization based on circumstances of the environment through which the vehicle traverses. However, in other examples, localization may be performed using any or all of GPS, SLAM, CLAMS, and the semantic segmentation techniques for localization based on repeating objects without regard to whether a reliable GPS signal and/or substantial landmarks are available and/or without regard to whether the vehicle is in or approaching a tunnel, overpass, or other area in which GPS, SLAM, and/or CLAMS may not be as reliable or accurate. In other words, any or all of the localization systems or techniques available to a vehicle may be used simultaneously without departing from the scope of the described techniques.

Figure 2:
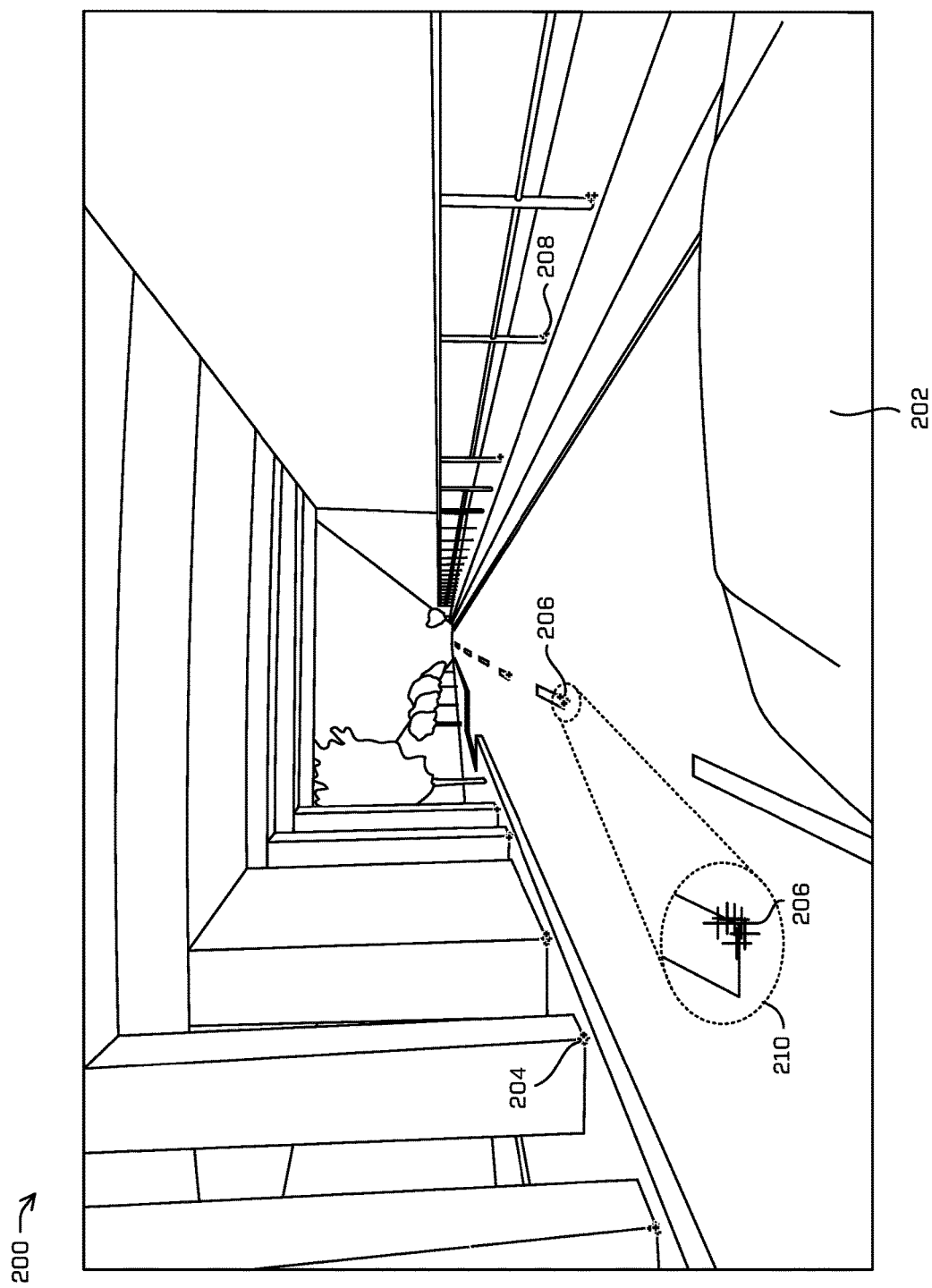
FIG. 2 is an illustration of an image captured by a camera of a vehicle that may have a feature identification of a repeated object classification, in accordance with examples of the disclosure.

FIG. 2 is an illustration of an image 200 captured by a camera of a vehicle that may have a feature identification of a repeated object classification, in accordance with examples of the disclosure. In at least some examples, FIG. 2 may be representative of a mapping operation in which multiple observations of the same object in the environment are made (either by a same sensor or multiple sensors of multiple vehicles).

The image 200 may be captured by a camera of a vehicle 202, a portion of which is included in the image 200. The vehicle 202 may be traversing an environment that includes a tunnel, where GPS, SLAM, and/or CLAMS may not provide reliable or accurate localization information to the vehicle 202. The vehicle 202 may have semantically segmented the image 200 to identify different objects in the image as described in relation to FIG. 1. In some examples, the vehicle 202 may be configured to detect a feature, such as a corner, of objects having a particular classification as depicted in the image 200 to be used in localizing the vehicle 202. The vehicle 202 may project points estimating a location of a feature. The additional points may be projected onto the image 200 in order to combine the multiple measurements to reduce a level of uncertainty associated with the landmark. In such examples, the multiple observations (e.g., cluster 206) may be combined in image space (e.g. using weighted averaging or the like) in order to determine a position of the landmark in the environment. Similarly, the multiple observations may be unprojected from image space in order to determine estimated associated locations of each detected feature in the environment. Such unprojected locations may then be combined (e.g., by averaging) in order to determine the landmark location. In at least some examples, various other techniques may be used for combining such detections including, but not limited to, bundle adjustments, Kalman filters, RANSAC, or by using M-estimators such as maximum likelihood estimates and/or non-linear least squares optimization.

In the depicted example, a bottom right corner (with respect to the orientation of the image 200) of a rectangle may be the feature desired to be used for localization. As multiple observations of the object are made, a cluster of points at or near the location of the feature in the image, such as clusters 204, 206, and 208. The cluster 204 is associated with a bottom right corner of a pillar within the tunnel, the cluster 206 is associated with a bottom right corner of a lane marker, and the cluster 208 is associated with a bottom right corner of a handrail. An enlarged detail view 210 depicts the cluster 206 associated with the bottom right corner of the lane marker, showing that multiple points are included in the cluster representing estimated locations of the feature.

As above, the clusters 204, 206, and/or 208 may be used to refine the location of the feature to be used for localization. In some examples, a mode or mean of a cluster of points representing the feature may be used as the location of the feature (i.e., the landmark) for localizing the vehicle 202. In other examples, an outermost point may be used as the location of the feature, such as to encompass all of the points in the cluster representing the feature. As more points are added to the cluster (e.g., as the vehicle 202 gets closer to the object), the mode, median, and/or outermost point may more accurately reflect the actual location of the feature, thereby increasing certainty of the location of the vehicle with respect to the feature and the object. Additional details regarding designating a landmark location associated with an object may be found in the discussion of FIG. 6.

Figure 3:
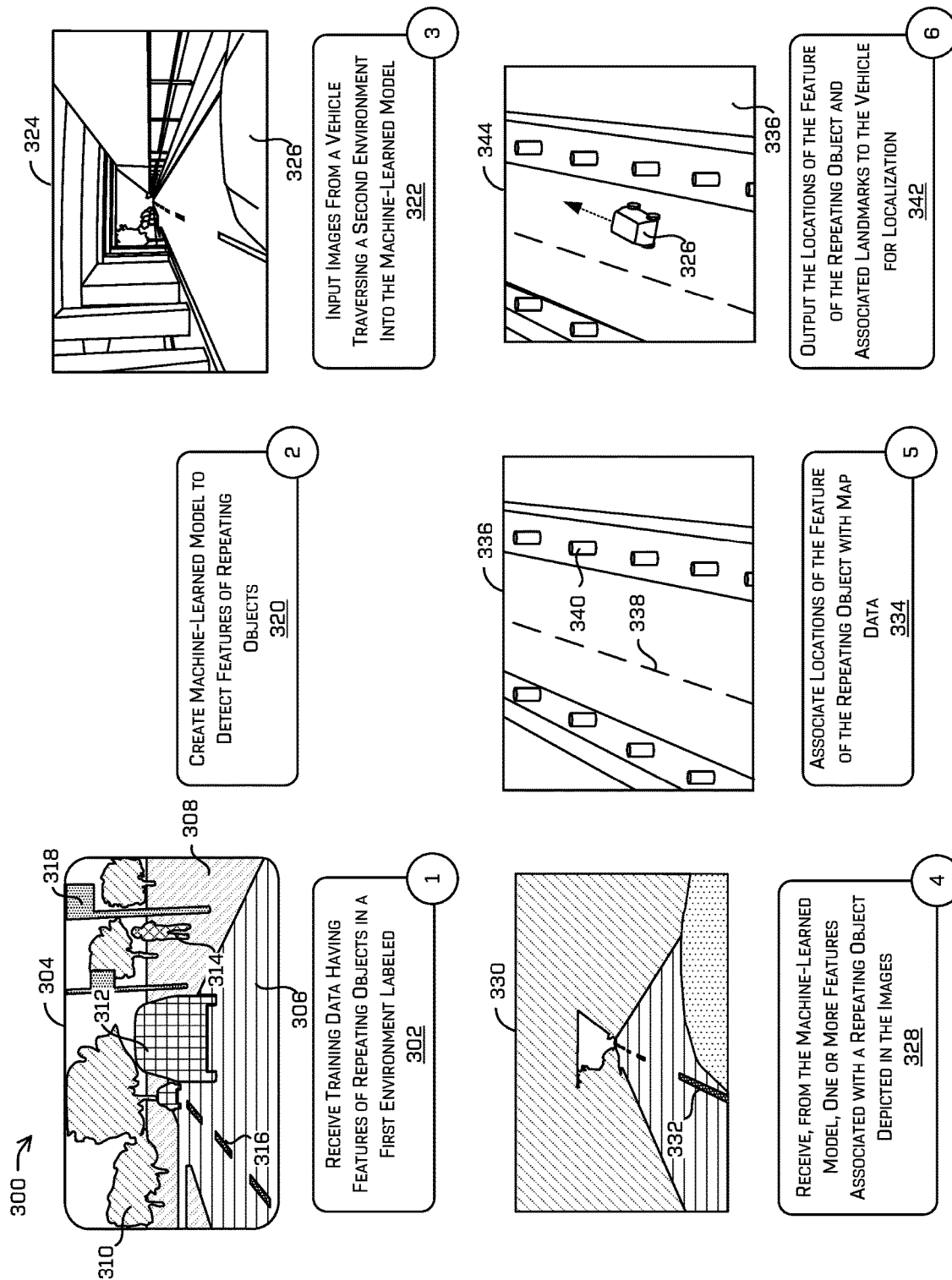
FIG. 3 is a pictorial flow diagram for creating and using a machine-learned model to detect features of repeated objects in an environment, in accordance with examples of the disclosure.

FIG. 3 is a pictorial flow diagram 300 for creating and using a machine-learned model to detect features of repeated objects in an environment, in accordance with examples of the disclosure. In such an example, images may be input into such a model and features associated with repeated object classifications may be output.

An operation 302 (indicated by "1") includes receiving training data having features of repeating objects (which, in some examples, may repeat regularly at some interval) in a first environment labeled. A semantically segmented image 304 is shown which includes areas which may be labeled as a drivable region 306, a non-drivable region 308, vegetation 310, other vehicles 312, a pedestrian 314, lane markers 316, and street signs 318. Features detected in the semantically segmented image 304 may be one of many images used as training data for a machine-learned model (e.g., such features may be used as ground truth for backpropagating parameters based on inputting the corresponding images). In some examples, the labeled feature may be a corner of a repeating object, a side of a repeating object, a center of a repeating object, or another detected feature of the repeating object (an embedding, feature vector, SURF, SIFT, BRIEF, ORB, AKAZE, Harris corner, etc.).

An operation 320 (indicated by "2") includes creating a machine-learned model to detect features of repeating objects. In some examples, the machine-learned model is a supervised or semi-supervised model in which the training data has the desired features of the repeating objects labeled, as just described. However, in some cases, the machine-learned model may be an unsupervised model, in which the model finds structure in the training data (e.g., grouping or clustering of data points which may correspond to a feature), and identifies features of repeating objects on its own. In addition to creating the machine-learned model to detect structural features of repeating objects, additional information may be used to train the model, such as distances at which the objects regularly repeat, environments and/or locations in which repeating objects are present, and so forth. For example, the machine-learned model may detect that an object (e.g., lane marker 316) in the semantically segmented image 304 has a size and/or shape similar to lane markers. Additionally, the machine-learned model may detect that the object repeats itself in the semantically segmented image 304, similar to a known distance between lane markers. Accordingly, the machine-learned model may output a prediction that the object (e.g., lane marker 316) is a repeating object in the semantically segmented image 304. Additionally, the machine-learned model may determine a feature that is shared between objects of the lane marker object type, such as a corner, and output an indication of the shared feature as well.

An operation 322 (indicated by "3") includes inputting images from a vehicle traversing a second environment into the machine-learned model. For instance, an image 324 depicts a portion of a vehicle 326 as the vehicle 326 is traversing an environment. The image 324 may be input to the machine-learned model created at operation 320 to detect features associated with repeating objects in the image 324. As discussed herein, initiating the detection of features of repeating objects may in some cases occur responsive to other localization systems of the vehicle 326 being unable to provide accurate locations of the vehicle in response to a variety of environmental conditions.

An operation 328 (indicated by "4") includes receiving, from the machine-learned model, one or more features associated with a repeating object(s) depicted in the images. For example, a semantically segmented image 330 may be output by the machine-learned model, depicting an object 332 and one or more features of the object 332. As noted above, features may include a corner, an edge, a center, and so forth, and may be identified using Harris corners and/or using Laplacian kernels, and determining shared features between multiple objects of an object type that repeats in the environment.

An optional operation 334 (indicated by "5") includes associating locations of the feature of the repeating object(s) with map data. In many cases, locations of features associated with the repeated object classification (e.g., landmarks) are included in maps and/or map data that is output to vehicles for localization and navigation. For example, a map 336 depicts a portion of an environment which may include several repeating objects including lane markers 338 and pillars 340 within a tunnel. Sizes, dimensions, distances between instances, and other features of the repeating objects may be included in the map data, and/or deduced from the map data. For example, a sensor system of a vehicle such as a lidar system may be able to detect a size of an object such as a tunnel pillar, and if the pillar is represented as a point on a map, the vehicle may center the size of the pillar on the map point to determine where an edge or corner of the pillar is located in the environment. Measured features may then be associated with such landmarks for subsequent localization.

An operation 342 (indicated by "6") includes outputting the locations of the feature of the repeating object and their associated landmarks to the vehicle for localization. An example 344 depicts the vehicle 326 included in the map 336 at a location determined using the machine-learned model input with images of the environment. The map 336 and the estimated location of the vehicle 326 may be used by the vehicle 326 to determine the corrected location of the vehicle, update an estimated location of the vehicle by another system of the vehicle 326, and so forth. In some examples, the image 324 and/or the semantically segmented image 330 may be used to further train the machine-learned model to recognize repeating objects and/or features of said objects in an environment, determine distances between said features or objects, update a map, and so forth.

Figure 4:
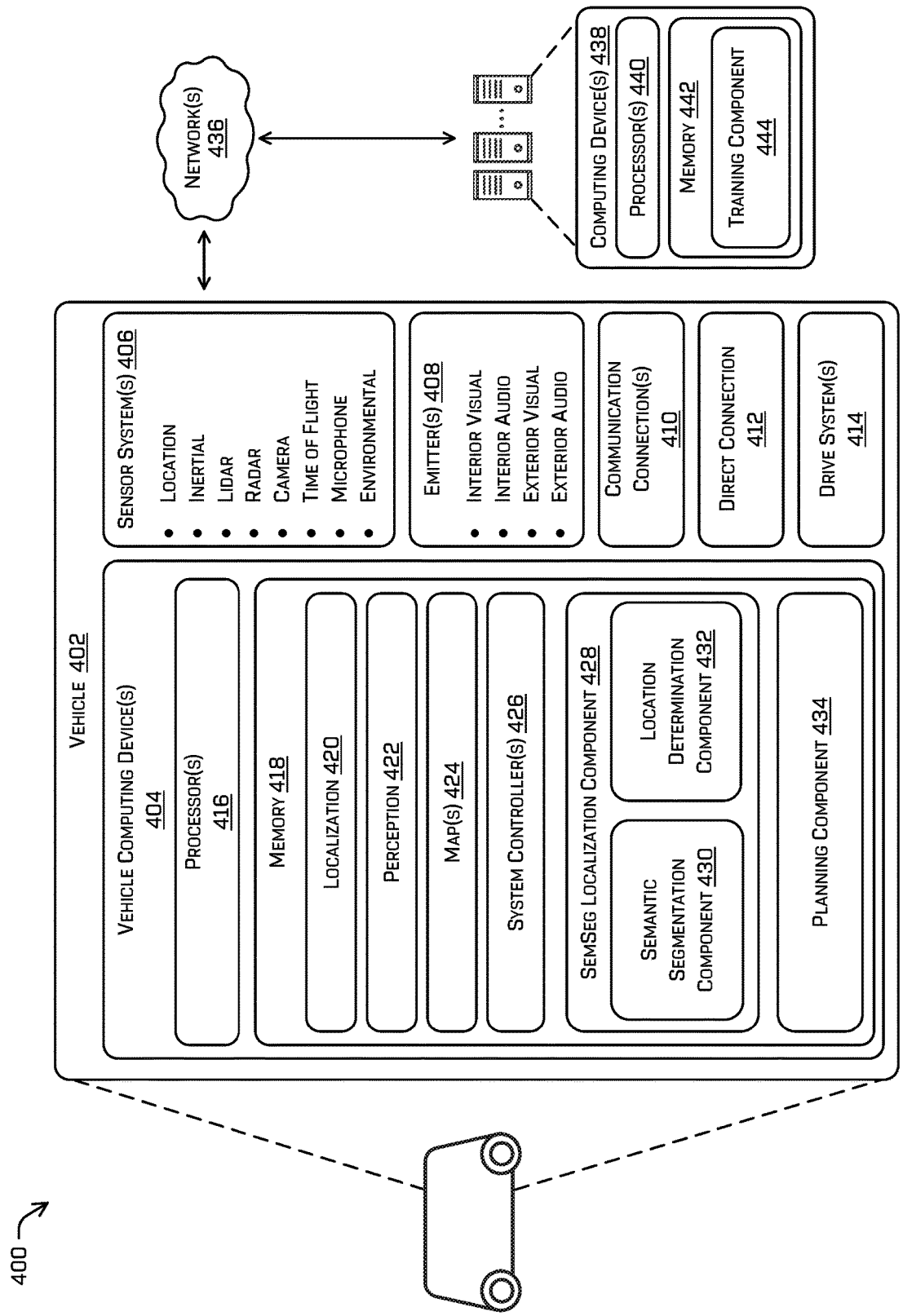
FIG. 4 depicts a block diagram of an example system for implementing the techniques described herein.

FIG. 4 depicts a block diagram of an example system 400 for implementing the techniques described herein. In at least one example, the system 400 can include a vehicle 402, such as an autonomous, semi-autonomous, or manually controlled vehicle.

The vehicle 402 can include vehicle computing device(s) 404, one or more sensor systems 406, one or more emitters 408, one or more communication connections 410, at least one direct connection 412, and one or more drive systems 414.

The vehicle computing device(s) 404 can include one or more processors 416 and memory 418 communicatively coupled with the one or more processors 416. In the illustrated example, the vehicle 402 is an autonomous vehicle; however, the vehicle 402 could be any other type of vehicle or robotic platform. In the illustrated example, the memory 418 of the vehicle computing device(s) 404 stores a localization component 420, a perception component 422, one or more maps 424, one or more system controllers 426, a semantic segmentation (SemSeg) localization component 428, a semantic segmentation component 430, location determination component 432, and a planning component 434. Though depicted in FIG. 4 as residing in the memory 418 for illustrative purposes, it is contemplated that the localization component 420, the perception component 422, the one or more maps 424, the one or more system controllers 426, the SemSeg localization component 428, the semantic segmentaion component 430, the location determination component 432, and the planning component 434 can additionally, or alternatively, be accessible to the vehicle 402 (e.g., stored on, or otherwise accessible by, memory remote from the vehicle 402).

In at least one example, the localization component 420 can include functionality to receive data from the sensor system(s) 406 to determine a position and/or orientation of the vehicle 402 (e.g., one or more of an x-, y-, z-position, roll, pitch, or yaw). For example, the localization component 420 can include and/or request/receive a map of an environment and can continuously determine a location and/or orientation of the autonomous vehicle within the map. In some instances, the localization component 420 can utilize SLAM (simultaneous localization and mapping), CLAMS (calibration, localization and mapping, simultaneously), relative SLAM, bundle adjustment, non-linear least squares optimization, or the like to receive image data, lidar data, radar data, time of flight data, IMU data, GPS data, wheel encoder data, and the like to accurately determine a location of the autonomous vehicle. In some examples, the localization component 420 may communicate with the SemSeg localization component 428 to determine a location of the autonomous vehicle, and/or refine locations provided by other systems utilized by the localization component 420. In some instances, the localization component 420 can provide data to various components of the vehicle 402 to determine an initial position of an autonomous vehicle for generating a trajectory, for determining to retrieve map data, and/or determining a speed of the vehicle 402 when a sequence of images is captured for determining a velocity of an object, as discussed herein.

In some instances, the perception component 422 can include functionality to perform object detection, segmentation, and/or classification. In some examples, the perception component 422 can provide processed sensor data that indicates a presence of an entity that is proximate to the vehicle 402 and/or a classification of the entity as an entity type (e.g., car, pedestrian, cyclist, animal, building, tree, road surface, curb, sidewalk, stoplight, stop sign, lane marker, unknown, etc.). In additional or alternative examples, the perception component 422 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

The memory 418 can further include one or more maps 424 that can be used by the vehicle 402 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed. In at least one example, the one or more maps 424 can include at least one map (e.g., images and/or a mesh). In some examples, the vehicle 402 can be controlled based at least in part on the maps 424. That is, the maps 424 can be used in connection with the localization component 420, the perception component 422, the SemSeg localization component 428, or the planning component 434 to determine a location of the vehicle 402, identify objects in an environment, and/or generate routes and/or trajectories to navigate within an environment.

In some examples, the one or more maps 424 can be stored on a remote computing device(s) (such as the computing device(s) 438) accessible via network(s) 436. In some examples, multiple maps 424 can be stored based on, for example, a characteristic (e.g., type of entity, time of day, day of week, season of the year, etc.). Storing multiple maps 424 can have similar memory requirements, but increase the speed at which data in a map can be accessed.

In some examples, the one or more maps 424 can store sizes or dimensions of objects associated with individual locations in an environment. For example, as the vehicle 402 traverses the environment and as maps representing an area proximate to the vehicle 402 are loaded into memory, one or more sizes or dimensions of objects associated with a location can be loaded into memory as well. In some examples, a known size or dimension of an object at a particular location in the environment may be used to determine a depth of a feature of an object relative to the vehicle 402 when determining a location of the vehicle 402.

In general, the SemSeg localization component 428 can determine a location of the vehicle 402 based on data provided by the sensor system(s) 406. In some instances, the SemSeg localization component 428 can provide location information generated by the semantic segmentation component 430 and/or the location determination component 432 to the planning component 434 to determine when and/or how to control the vehicle 402 to traverse an environment. As discussed herein, the SemSeg localization component 428 can receive image data, map data, lidar data, and the like to determine location-related information about objects in an environment.

The semantic segmentation component 430 included in the SemSeg localization component 428 receives images, such as from a camera of the sensor system 406, and labels pixels of the received images according to object classifications of objects identified in the images. For instance, the semantic segmentation component 430 may include an architecture comprised of an encoder network followed by a decoder network. The encoder network may be a pre-trained classification network (e.g., VGG-16, VGG-19, ResNet, etc.), and the decoder may semantically project discriminative features learned by the encoder onto pixel space of the images received from the sensor system 406 to get a dense classification. Different approaches to semantically segment an image by the semantic segmentation component may include region-based semantic segmentation, fully convolutional network-based semantic segmentation, and weakly supervised semantic segmentation, to name some examples. The semantic segmentation component 430 may further identify features of the repeating objects labeled in the segmented images (e.g., a corner, a center, an edge, etc.) which may be used to accurately determine a location of the vehicle 402 with respect to the feature of the repeating object.

The location determination component 432 can determine, from the identified feature of the repeating objects, a location of the vehicle with respect to the feature. For example, the location determination component 432 may receive sensor data from a lidar sensor, a radar sensor, a time of flight sensor, and/or a camera of the sensor system 406 indicating a distance of the feature of the repeated object from the vehicle 402. The location determination component 432 may also receive a location of the associated landmark from the map 424. Thus, the location determination component 432 may determine a location of the vehicle 402 in the environment based on differences between the measured feature and landmark, by performing bundle adjustment based on multiple observations of a plurality of features over time, SLAM, Kalman filters, or the like to localize the vehicle with respect to the corresponding locations of the features in the environment. The location determination component 432 may supply the location of the vehicle 402 determined with respect to the feature of the repeated object to the localization system 420, for instance, to supplement and/or refine localization determinations by other systems. In some examples, the location determination component 432 can provide information regarding the location of the vehicle 402 to the planning component 434 to use in controlling the vehicle 402.

In general, the planning component 434 can determine a path for the vehicle 402 to follow to traverse the environment. For example, the planning component 434 can determine various routes and trajectories and various levels of detail. For example, the planning component 434 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 434 can generate an instruction for guiding the autonomous vehicle along at least a portion of the route from the first location to the second location. In at least one example, the planning component 434 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 402 to navigate.

In some instances, the planning component 434 can generate one or more trajectories for the vehicle 402 based at least in part on the location of the vehicle 402 in the environment as determined using semantically segmented images, as discussed herein. In some examples, the planning component 434 can use temporal logic, such as linear temporal logic and/or signal temporal logic, to evaluate one or more trajectories of the vehicle 402.

In at least one example, the vehicle computing device(s) 404 can include one or more system controllers 426, which can be configured to control steering, propulsion, braking, safety, emitters, communication, and other systems of the vehicle 402. These system controller(s) 426 can communicate with and/or control corresponding systems of the drive system(s) 414 and/or other components of the vehicle 402.

As can be understood, the components discussed herein (e.g., the localization component 420, the perception component 422, the one or more maps 424, the one or more system controllers 426, the SemSeg localization component 428, the semantic segmentation component 430, the location determination component 432, and the planning component 434) are described as divided for illustrative purposes. However, the operations performed by the various components can be combined or performed in any other component. By way of example, localization functions may be performed by the perception component 422 (e.g., rather than the SemSeg localization component 428) to reduce the amount of data transferred by the system.

In at least one example, the sensor system(s) 406 can include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 406 can include multiple instances of each of these or other types of sensors. For instance, the lidar sensors can include individual lidar sensors located at the corners, front, back, sides, and/or top of the vehicle 402. As another example, the camera sensors can include multiple cameras disposed at various locations about the exterior and/or interior of the vehicle 402. The sensor system(s) 406 can provide input to the vehicle computing device(s) 404. Additionally or alternatively, the sensor system(s) 406 can send sensor data, via the one or more networks 436, to the one or more computing device(s) at a particular frequency, after a lapse of a predetermined period of time, in near real-time, etc.

The vehicle 402 can also include one or more emitters 408 for emitting light and/or sound, as described above. The emitters 408 in this example include interior audio and visual emitters to communicate with passengers of the vehicle 402. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 408 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 402 can also include one or more communication connection(s) 410 that enable communication between the vehicle 402 and one or more other local or remote computing device(s). For instance, the communication connection(s) 410 can facilitate communication with other local computing device(s) on the vehicle 402 and/or the drive system(s) 414. Also, the communication connection(s) 410 can allow the vehicle to communicate with other nearby computing device(s) (e.g., other nearby vehicles, traffic signals, etc.). The communication connection(s) 410 also enable the vehicle 402 to communicate with a remote teleoperations computing device or other remote services.

The communication connection(s) 410 can include physical and/or logical interfaces for connecting the vehicle computing device(s) 404 to another computing device or a network, such as network(s) 436. For example, the communications connection(s) 410 can enable Wi-Fi-based communication such as via frequencies defined by the IEEE 802.11 standards, short range wireless frequencies such as Bluetooth®, cellular communication (e.g., 2G, 3G, 4G, 4G LTE, 4G, etc.) or any suitable wired or wireless communications protocol that enables the respective computing device to interface with the other computing device(s).

In at least one example, the vehicle 402 can include one or more drive systems 414. In some examples, the vehicle 402 can have a single drive system 414. In at least one example, if the vehicle 402 has multiple drive systems 414, individual drive systems 414 can be positioned on opposite ends of the vehicle 402 (e.g., the front and the rear, etc.). In at least one example, the drive system(s) 414 can include one or more sensor systems to detect conditions of the drive system(s) 414 and/or the surroundings of the vehicle 402. By way of example and not limitation, the sensor system(s) can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive system, lidar sensors, radar sensors, etc. Some sensors, such as the wheel encoders can be unique to the drive system(s) 414. In some cases, the sensor system(s) on the drive system(s) 414 can overlap or supplement corresponding systems of the vehicle 402 (e.g., sensor system(s) 406). Wheel encoders, inertial sensors, other sensors included in the drive systems 414 may be used to measure motion of the vehicle 402 and use the measured motion to estimate a position of the vehicle when other systems (e.g., GPS, SLAM, CLAMS, etc.) are unavailable, and/or in between repeated objects used to localize the vehicle 402 according to the techniques described herein.

The drive system(s) 414 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 414 can include a drive system controller which can receive and preprocess data from the sensor system(s) and to control operation of the various vehicle systems. In some examples, the drive system controller can include one or more processors and memory communicatively coupled with the one or more processors. The memory can store one or more components to perform various functionalities of the drive system(s) 414. Furthermore, the drive system(s) 414 also include one or more communication connection(s) that enable communication by the respective drive system with one or more other local or remote computing device(s).

In at least one example, the direct connection 412 can provide a physical interface to couple the one or more drive system(s) 414 with the body of the vehicle 402. For example, the direct connection 412 can allow the transfer of energy, fluids, air, data, etc. between the drive system(s) 414 and the vehicle. In some instances, the direct connection 412 can further releasably secure the drive system(s) 414 to the body of the vehicle 402.

In at least one example, the localization component 420, the perception component 422, the one or more maps 424, the one or more system controllers 426, the SemSeg localization component 428, the semantic segmentation component 430, the location determination component 432, and the planning component 434 can process sensor data, as described above, and can send their respective outputs, over the one or more network(s) 436, to one or more computing device(s) 438. In at least one example, the localization component 420, the perception component 422, the one or more maps 424, the one or more system controllers 426, the SemSeg localization component 428, the semantic segmentation component 430, the location determination component 432, and the planning component 434 can send their respective outputs to the one or more computing device(s) 438 at a particular frequency, after a lapse of a predetermined period of time, in near real-time, etc.

In some examples, the vehicle 402 can send sensor data to one or more computing device(s) 438 via the network(s) 436. In some examples, the vehicle 402 can send raw sensor data to the computing device(s) 438. In other examples, the vehicle 402 can send processed sensor data and/or representations of sensor data to the computing device(s) 438. In some examples, the vehicle 402 can send sensor data to the computing device(s) 438 at a particular frequency, after a lapse of a predetermined period of time, in near real-time, etc. In some cases, the vehicle 402 can send sensor data (raw or processed) to the computing device(s) 438 as one or more log files.

The computing device(s) 438 can include processor(s) 440 and a memory 442 storing a training component 444.

In some instances, the training component 444 can include functionality to train one or more models to classify objects during semantic segmentation, determine repeating objects, determine characteristics and features of repeating objects, and the like. In some instances, the training component 444 can communicate information generated by the one or more models to the vehicle computing device(s) 404 to revise how to control the vehicle 402 in response to different situations.

For instance, aspects of some or all of the components discussed herein can include any models, algorithms, and/or machine learning algorithms. For example, in some instances, the components in the memory 442 (and the memory 418, discussed above) can be implemented as a neural network. In some examples, the training component 444 can utilize a neural network to generate and/or execute one or more models to improve various aspects of localization for use in trajectory planning.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet40, ResNet101, VGG, DenseNet, PointNet, and the like.

The processor(s) 416 of the vehicle 402 and the processor(s) 440 of the computing device(s) 438 can be any suitable processor capable of executing instructions to process data and perform operations as described herein. By way of example and not limitation, the processor(s) 416 and 440 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 418 and 442 are examples of non-transitory computer-readable media. The memory 418 and 442 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 4 is illustrated as a distributed system, in alternative examples, components of the vehicle 402 can be associated with the computing device(s) 438 and/or components of the computing device(s) 438 can be associated with the vehicle 402. That is, the vehicle 402 can perform one or more of the functions associated with the computing device(s) 438, and vice versa. Further, aspects of the SemSeg localization component 428 and/or the planning component 434 can be performed on any of the devices discussed herein.

Figure 5:
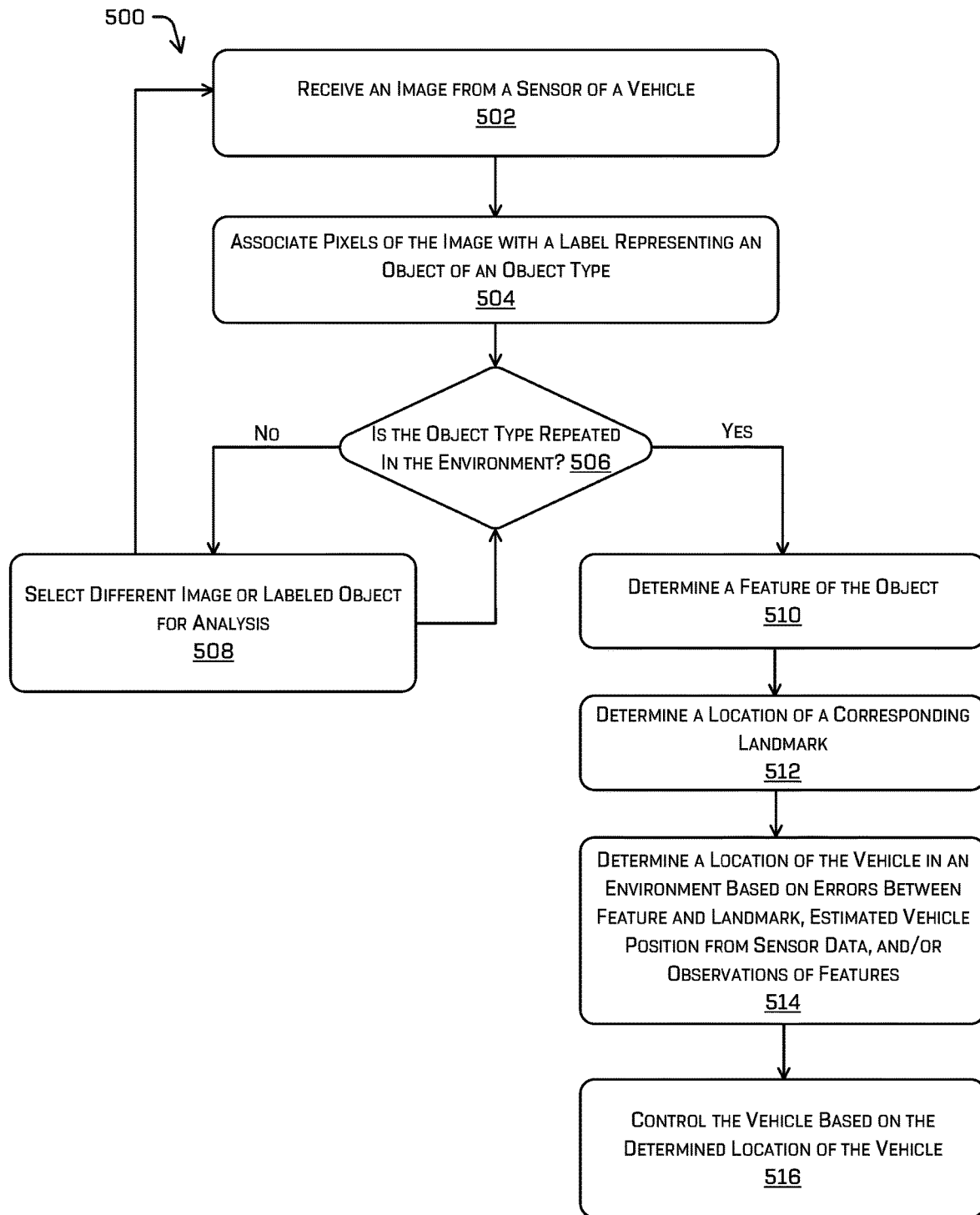
FIG. 5 depicts an example process for determining a location of a vehicle based at least in part on detected features, in accordance with examples of the disclosure.

FIG. 5 depicts an example process 500 for determining a location of a vehicle based at least in part on detected features, in accordance with examples of the disclosure. For example, some or all of the process 500 can be performed by one or more components in FIG. 4, as described herein. For example, some or all of the process 500 can be performed by the vehicle computing device(s) 404. Further, any of the operations described in the example process 500 may be executed in parallel, in a different order than depicted in the process 500, omit any of the operations of the depicted process 500, combined with operations of the example process 600, and the like.

At operation 502, the process can include receiving an image from a sensor of a vehicle. For example, a camera may be included as a sensor on an autonomous vehicle traversing an environment. The camera may capture images of the surrounding environment as the vehicle traverses the environment.

At operation 504, the process can include associating pixels of the image with a label representing an object of an object type (or classification). In some examples, associating the pixels of the image with the label may be part of a semantic segmentation process performed on the image, where pixels in different areas of the image are associated with different labels. Semantically segmenting the image may involve a neural network, though any other computer vision algorithm is contemplated. The network may comprise a pre-trained classification network (e.g., VGG-16, VGG-19, ResNet, etc.) and, in at least some examples, may be further trained to output features associated with particular object classifications. In some examples, the object type may correspond to a (regularly) repeating object, and the object may be one instance of the repeating object.

At operation 506, a determination is made as to whether the object type is repeated in the environment. For instance, the location determination component 432 may store a number of object types that repeat in an environment, such as lane markers, light posts, parking meters, and so forth as described herein. If the label representing the object does not correspond to an object type that repeats in the environment, the process may proceed to operation 508, in which a different image or object is selected from labeled objects in the image to determine whether an object type of the different object repeats in the environment. If no other objects are detected in the image having a particular object classification (e.g., a class which is frequently observed in an environment and/or which is known to have distinguishable features to track), for instance, than another image may be received according to operation 502 (e.g., as the vehicle continues to traverse the environment) to analyze whether a repeating object is depicted as described in operation 504. If another object is detected in the image that may repeat in the environment, then the image and/or other images are analyzed according to the operation 504 for the other object. In some cases, analysis of multiple images may occur substantially simultaneously, e.g., in parallel.

If the object type of the object is determined to repeat in the environment, the process may proceed to operation 510, in which a feature of the object is determined. The feature of the object may be a corner, edge, or center of the object, to name a few examples, or as otherwise described herein.

An operation 512 includes determining a location of a corresponding landmark (premapped feature). In some examples, such a landmark may have been determined based at least in part on a mean or mode of a cluster of features previously detected that were combined and may be used as a reference point for determining the location of the feature. In some examples, lidar, radar, or time of flight may be used to determine location of the feature in the environment. In some cases, lidar data may be fused with image data associated with the image to determine a depth of the object based on a three-dimensional representation of the environment obtained from a lidar sensor projected onto the image, and associating the cluster of points of the feature with image coordinates of the image.

An operation 514 includes determining a location of the vehicle in an environment based on one or more of errors (differences) between the measured feature and the corresponding landmark, an estimated position of the vehicle based on additional sensor data, and/or multiple observations of a plurality of features as the vehicle drives through the environment. In some examples, map data received by the vehicle may include the location of the landmark (previously mapped feature associated with the object in the environment).

An operation 516 includes controlling the vehicle based on the determined location of the vehicle. For instance, controlling the vehicle may include updating a trajectory, adjusting or maintaining a speed of the vehicle, outputting a notification to passengers, and so forth. Controlling the vehicle may also include updating locations of the vehicle estimated by other systems, such as an odometer, wheel encoder, etc. The determined location may in some cases supplement other localization systems of the vehicle to provide accurate locations for trajectory planning and vehicle operations.

Figure 6:
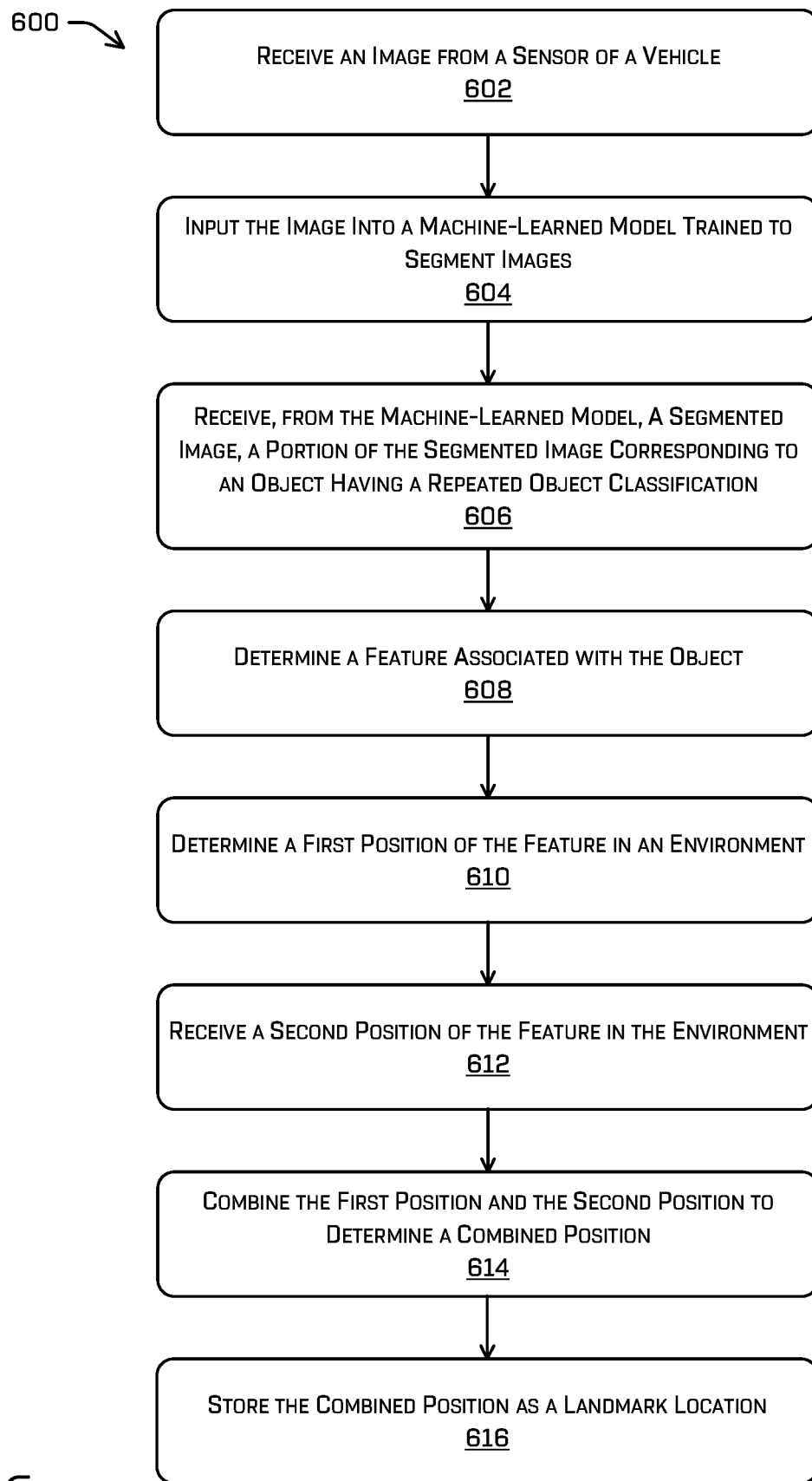
FIG. 6 depicts an example process for designating a landmark location for an object using multiple positions of a feature of the object, in accordance with examples of the disclosure.

FIG. 6 depicts an example process 600 for designating a landmark location for an object using multiple positions of a feature of the object, in accordance with examples of the disclosure. For example, some or all of the process 600 can be performed by one or more components in FIG. 4, as described herein. For example, some or all of the process 600 can be performed by the vehicle computing device(s) 404. Further, any of the operations described in the example process 600 may be executed in parallel, in a different order than depicted in the process 600, omit any of the operations of the depicted process 600, combined with operations of the example process 500, and the like.

An operation 602 includes receiving an image from a sensor of a vehicle. For example, a camera may be included as a sensor on an autonomous vehicle traversing an environment. The camera may capture images of the surrounding environment as the vehicle traverses the environment.

An operation 604 includes inputting the image into a machine-learned model trained to segment images. In some examples, the machine-learned model may be trained to associate pixels of the image with the label, where pixels in different areas of the image are associated with different labels. The machine-learned model used to segment the image in some cases may be a neural network, though any other computer vision algorithm is contemplated. The network may comprise a pre-trained classification network (e.g., VGG-16, VGG-19, ResNet, etc.) and, in at least some examples, may be further trained to output features associated with particular object classifications. In some examples, the object type may correspond to a repeated object classification.

An operation 606 includes receiving, from the machine-learned model, a segmented image, where a portion of the segmented image corresponds to an object having a repeated object classification. In some examples, the object may be depicted in the image received from the sensor of the vehicle, and may be one instance of the repeated object classification in an environment.

An operation 608 includes determining a feature associated with the object. Determining the feature may include detection of a corner (e.g., using a Harris corner detector), detection of an edge (e.g., using a Laplacian kernel), detecting extreme pixels associated with the object (e.g., pixels associated with an edge, corner, etc.), SIFT, SURF, AKAZE, ORB, BRIEF, embeddings, feature vectors, and so forth.

An operation 610 includes determining a first position of the feature in an environment. In some examples, determining the first position may be based at least in part on a projection of the feature onto a three-dimensional map of the environment, by determining a distance from the sensor to the feature (e.g., using lidar, TOF, a known size of the object, or other techniques) and associating the determined distance with a known location of the vehicle, and so forth.

An operation 612 includes receiving a second position of the feature in the environment. In some examples, the second position of the feature may be received following receiving another image from a sensor of a vehicle (e.g., the same sensor or a different sensor of the same or different vehicle), and executing one or more of the operations 604-610 using the additional image. In some cases, an additional image may be received from log data generated from historical sensor data captured of an environment. The log data may be generated by associating historical image data and based on other historical sensor data indicating the positions of objects depicted in images. The historical sensor data may include or be based at least in part on historical lidar data, radar data, image data, time of flight data, or combinations of these or other sensor modalities. The log data may include pose information relating to a pose of an image sensor used to capture an image of the object at a time the image was captured. Alternatively or additionally, the second position of the feature may be retrieved directly from map data, such as in GPS coordinates of a landmark location of the feature.

An operation 614 includes combining the first position and the second position to determine a combined position. For instance, the first position and the second position (along with any number of additional positions of the feature) may be combined by performing a weighted average of the first position, the second position, and/or any additional positions of the feature. Weights of the weighted average may be based at least in part on a distance of an image sensor used to capture an image depicting the feature of the object to the position of the object (e.g., determined using lidar, TOF, map data, or the like). For instance, a position in which the image sensor is closer to the position of the object may receive a higher weight than a position in which the image sensor is further from the position of the object. Weights of the weighted average may additionally or alternatively be based on an angle between an orientation of the image sensor used to capture an image depicting the feature of the object and the position of the object. For example, an image of the object captured closer to a 90-degree angle by the image sensor may receive a higher weight than an image of the object captured closer to a zero- or 180-degree angle by the image sensor.

In some examples, the first position and the second position (and any additional positions) may be combined using a bundle adjustment to reconstruct the three-dimensional scene that includes the object and the feature of the object. In additional examples, the combined position may be determined by determining a point in the environment at which a ray from a camera center of a camera used to capture the image passing through the feature of the object intersects a three-dimensional map of the environment. Then, a plane is determined proximate the camera used to capture the object, and the position of the feature in the environment is determined based on where the ray intersects the plane. In at least some examples, various other techniques may be used for combining such positions including, but not limited to, Kalman filters, RANSAC, or by using M-estimators such as maximum likelihood estimates and/or non-linear least squares optimization.

An operation 616 includes storing the combined position as a landmark location. The landmark location may be incorporated into map data (e.g., maps 424), which may be output to a vehicle to use in localization, such as in combination with semantically segmented images generated by the vehicle as the vehicle traverses the environment.

EXAMPLE CLAUSES

A: A system comprising: one or more processors; and one or more computer-readable media storing instructions executable by the one or more processors, wherein the instructions, when executed, cause the system to perform operations comprising: receiving an image from a sensor of an autonomous vehicle traversing an environment; determining a subset of pixels of the image associated with an object having an object type which occurs repeatedly in the environment; determining, based at least in part on the subset of pixels, an image feature indicative of an image location of a portion of the object represented in the image; determining, based at least in part on a map, a landmark location of the portion of the object in the environment; determining a difference between the image feature and the landmark location; determining, based at least in part on the difference, a position of the autonomous vehicle in the environment; and controlling the autonomous vehicle based on the determined position of the autonomous vehicle.

B: The system of paragraph A, wherein the landmark location is determined based at least in part on a mode or a mean of a cluster of points representing the portion of the object.

C: The system of paragraph A, the operations further comprising: projecting, as a projected landmark, the landmark location into the image, wherein determining the difference between a first image coordinate associated with the image feature and a second image coordinate associated with the projected landmark.

D: The system of paragraph A, wherein the sensor is a first sensor, the operations further comprising: receiving second sensor data from a second sensor of the autonomous vehicle; and determining, based at least in part on the second sensor data, an estimated location of the autonomous vehicle, wherein determining the position of the autonomous vehicle is further based at least in part on the estimated location.

E: The system of paragraph A, wherein the sensor is a first sensor, and wherein determining the position of the autonomous vehicle comprises: receiving sensor data from a second sensor of the autonomous vehicle, the sensor data comprising points representing the environment in three dimensions; projecting the points representing the environment in three dimensions onto the image so that a point of the points corresponds to a coordinate of the image; and determining a depth of the feature based at least in part on the point corresponding to the coordinate of the image.

F: A method comprising: receiving an image depicting an object having a repeated object classification in an environment; determining, based at least in part on the image, a feature, the feature indicative of a portion of the object represented in the image; and determining a position of the vehicle in the environment based at least in part on the feature.

G: The method of paragraph F, wherein determining the feature comprises: inputting the image into a machine learned model; and receiving the feature from the model.

H: The method of paragraph F, wherein determining the feature comprises: segmenting the image based at least in part on a plurality of classifications, the plurality of classifications comprising the repeated object classification; determining a subset of pixels of the image having the repeated object classification; and determining the feature based at least in part on the subset of pixels.

I: The method of paragraph H, wherein the feature comprises: a corner of the object, a SIFT feature, an embedding, or a feature vector.

J: The method of paragraph H, wherein the repeated object classification comprises: a lane marking, a light, a sign post, or a barrier.

K: The method of paragraph F, further comprising: determining an estimated position of the vehicle based at least in part on an additional sensor of the vehicle, wherein determining the position of the vehicle is further based at least in part on the estimated position, and wherein the additional sensor comprises one or more of: an inertial measurement unit, an accelerometer, a gyroscope, a magnetometer, or a wheel encoder.

L: The method of paragraph K, wherein determining the position of the vehicle is based at least in part on the estimated position, a covariance associated with the estimated position, or a covariance associated with the additional sensor.

M: The method of paragraph F, further comprising: determining, based at least in part on map data, an indication of a landmark location in the environment, the landmark location representative of the portion of the object in the environment; determining, based at least in part on projecting the landmark onto the image, an image coordinate of the landmark; and determining a difference between the image coordinate of the landmark and an image coordinate of the feature, wherein determining the position of the vehicle is based at least in part on the difference.

N: One or more computer-readable storage media comprising instructions that, when executed by one or more processors, perform operations including: receiving an image depicting an object having a repeated object classification in an environment; determining, based at least in part on a portion of the image associated with the object, a feature; determining a position of a landmark in the environment, the landmark indicative of the portion of the object in the environment associated with the feature; and determining a position of a vehicle in the environment based at least in part on the feature and the position of the landmark.

O: The one or more computer-readable storage media of paragraph N, the operations further comprising: receiving the image from a sensor of the vehicle traversing the environment; inputting the image into a neural network trained to semantically segment images; and receiving a semantically segmented image from the neural network, wherein determining the feature is based at least in part on the semantically segmented image.

P: The one or more computer-readable storage media of paragraph O, wherein the neural network is further trained to detect features of repeated objects, and wherein determining the feature is further based on receiving the feature from the neural network.

Q: The one or more computer-readable storage media of paragraph N, the operations further comprising: projecting, as a projected landmark, the landmark onto the image, wherein determining the position of the vehicle further comprises determining a difference between a first image coordinate associated with the feature and a second image coordinate associated with the projected landmark.

R: The one or more computer-readable storage media of paragraph N, wherein determining the feature comprises: segmenting the image based at least in part on a plurality of classifications, the plurality of classifications comprising the repeated object classification; determining a subset of pixels of the image having the repeated object classification; and determining the feature based at least in part on the subset of pixels.

S: The one or more computer-readable storage media of paragraph R, wherein the repeated object classification comprises: a lane marking, a light, a sign post, or a barrier.

T: The one or more computer-readable storage media of paragraph R, wherein the repeated object classification comprises: a lane marking, a light, a sign post, or a barrier.

While the example clauses described above are described with respect to one particular implementation, it should be understood that, in the context of this document, the content of the example clauses can also be implemented via a method, device, system, and/or computer-readable medium.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While individual examples are described herein as having certain features or components, the features and components of the individual examples can be combined and used together. While the operations herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more computer-readable media storing instructions executable by the one or more processors, wherein the instructions, when executed, cause the system to perform operations comprising:
receiving a first image from a sensor of an autonomous vehicle traversing an environment;
generating a segmented image by semantically segmenting the first image;
determining a subset of pixels of the segmented image associated with an object having an object type which occurs repeatedly in the environment;
determining an extreme pixel from among the subset of the pixels;
determining, based at least in part on the extreme pixel, an image feature indicative of an image location of a portion of the object represented in the segmented image;
determining, based at least in part on a map, a first position of the image feature;
determining, based at least in part on a second image, a second position of the image feature;
determining, based at least in part on the first position of the image feature and the second position of the image feature, a landmark location of the portion of the object in the environment;
determining a difference between the first image as represented in the subset of pixels of the segmented image and the landmark location;
determining, based at least in part on the difference, a position of the autonomous vehicle in the environment; and
controlling the autonomous vehicle based on the determined position of the autonomous vehicle.

2. The system of claim 1, wherein the landmark location is determined further based at least in part on a mode or a mean of a cluster of points representing the portion of the object.

3. The system of claim 1, the operations further comprising:
projecting, as a projected landmark, the landmark location into the first image,
wherein the difference is based at least in part on a first image coordinate associated with the image feature and a second image coordinate associated with the projected landmark.

4. The system of claim 1, wherein the sensor is a first sensor, the operations further comprising:
receiving second sensor data from a second sensor of the autonomous vehicle; and
determining, based at least in part on the second sensor data, an estimated location of the autonomous vehicle, wherein determining the position of the autonomous vehicle is further based at least in part on the estimated location.

5. The system of claim 1, wherein the sensor is a first sensor, and wherein determining the position of the autonomous vehicle comprises:
receiving sensor data from a second sensor of the autonomous vehicle, the sensor data comprising points representing the environment in three dimensions;
projecting the points representing the environment in three dimensions onto the first image so that a point of the points corresponds to a coordinate of the first image; and
determining a depth of the image feature based at least in part on the point corresponding to the coordinate of the first image.

6. A method comprising:
receiving a first image depicting an object having a repeated object classification in an environment;
generating a segmented image by semantically segmenting the first image;
determining, based at least in part on the segmented image, a feature indicative of a landmark location;
determining, based on map data, a first position of a portion of the object represented in the segmented image in the environment;
determining, based on a second image, a second position of the portion of the object represented in the segmented image in the environment;
determining, based at least in part on the first position and the second position, the landmark location; and
determining a position of a vehicle in the environment based at least in part on the feature as represented in the segmented image.

7. The method of claim 6, wherein determining the feature further comprises:
inputting the first image into a machine learned model; and
receiving the feature from the machine-learned model.

8. The method of claim 6, wherein generating the segmented image comprises:
segmenting the first image based at least in part on a plurality of classifications, the plurality of classifications comprising the repeated object classification;
determining a subset of pixels of the first image having the repeated object classification; and
determining the feature based at least in part on the subset of pixels.

9. The method of claim 8, wherein the feature comprises:
a corner of the object,
a SIFT feature,
an embedding, or
a feature vector.

10. The method of claim 8, wherein the repeated object classification comprises:
a lane marking,
a light,
a sign post, or
a barrier.

11. The method of claim 6, further comprising:
determining an estimated position of the vehicle based at least in part on an additional sensor of the vehicle,
wherein determining the position of the vehicle is further based at least in part on the estimated position, and
wherein the additional sensor comprises one or more of:

an inertial measurement unit,
an accelerometer,
a gyroscope,
a magnetometer, or
a wheel encoder.

12. The method of claim 11, wherein determining the position of the vehicle is based at least in part on the estimated position, a covariance associated with the estimated position, or a covariance associated with the additional sensor.

13. The method of claim 6, further comprising:
determining, based at least in part on the map data, an indication of the landmark location in the environment;
determining, based at least in part on projecting the landmark location onto the first image, an image coordinate of the landmark location; and
determining a difference between the image coordinate of the landmark location and an image coordinate of the feature,
wherein determining the position of the vehicle is based at least in part on the difference.

14. One or more computer-readable storage media comprising instructions that, when executed by one or more processors, perform operations including:
receiving a semantically segmented image depicting an object having a repeated object classification in an environment;
determining, based at least in part on a portion of the semantically segmented image associated with the object, a feature indicative of a landmark location;
determining, based on map data, a first position of a portion of the object represented in the semantically segmented image in the environment;
determining, based on an image, a second position of the portion of the object represented in the semantically segmented image in the environment;
determining, based at least in part on the first position and the second position, a position of a landmark in the environment, the landmark indicative of the portion of the object in the environment associated with the feature; and
determining a position of a vehicle in the environment based at least in part on the feature as represented in the semantically segmented image and the position of the landmark.

15. The one or more computer-readable storage media of claim 14, the operations further comprising:
receiving a second image from a sensor of the vehicle traversing the environment;
inputting the second image into a neural network trained to semantically segment images; and
receiving the semantically segmented image from the neural network.

16. The one or more computer-readable storage media of claim 15, wherein the neural network is further trained to detect features of repeated objects, and
wherein determining the feature is further based on receiving the feature from the neural network.

17. The one or more computer-readable storage media of claim 14, wherein the semantically segmented image is generated from a second image of the environment, the operations further comprising:
projecting, as a projected landmark, the landmark onto the second image,
wherein determining the position of the vehicle further comprises determining a difference between a first image coordinate associated with the feature and a second image coordinate associated with the projected landmark.

18. The one or more computer-readable storage media of claim 14, wherein the semantically segmented image is generated from a second image of the environment, wherein determining the feature comprises:
segmenting the second image based at least in part on a plurality of classifications, the plurality of classifications comprising the repeated object classification;
determining a subset of pixels of the second image having the repeated object classification; and
determining the feature based at least in part on the subset of pixels.

19. The one or more computer-readable storage media of claim 18, wherein the repeated object classification comprises:
a lane marking,
a light,
a sign post, or
a barrier.

20. The one or more computer-readable storage media of claim 14, wherein the feature comprises:
a corner of the object,
a SIFT feature,
an embedding, or
a feature vector.

* * * * *